United States Patent
Voyer

(10) Patent No.: US 7,116,991 B2
(45) Date of Patent: Oct. 3, 2006

(54) METHOD OF DETERMINING THE POSITION OF A MOBILE STATION IN A MOBILE TELECOMMUNICATION NETWORK

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 603 days.

(21) Appl. No.: 09/826,908

(22) Filed: Apr. 6, 2001

(65) Prior Publication Data

US 2001/0034238 A1 Oct. 25, 2001

(30) Foreign Application Priority Data

Apr. 21, 2000 (FR) .................................. 00 05334

(51) Int. Cl.
*H04Q 7/20* (2006.01)
*H04B 7/01* (2006.01)
*H04B 7/212* (2006.01)
*H04B 7/00* (2006.01)
*G01S 3/02* (2006.01)

(52) U.S. Cl. .............................. 455/456.5; 455/456.1; 455/456.2; 455/456.6; 455/502; 455/524; 342/463; 342/464; 370/321; 370/324; 370/337

(58) Field of Classification Search .. 455/456.1–456.3, 455/456.5–456.6, 502, 524; 342/457, 463, 342/464; 370/321, 324, 337, 350, 346, 347

See application file for complete search history.

(56) References Cited

U.S. PATENT DOCUMENTS

| | | |
|---|---|---|
| 5,600,706 A | 2/1997 | Dunn et al. |
| 5,646,632 A | 7/1997 | Khan et al. |
| 6,130,910 A * | 10/2000 | Anderson et al. ........... 375/238 |
| 6,163,696 A * | 12/2000 | Bi et al. ...................... 455/436 |
| 6,223,040 B1 * | 4/2001 | Dam ........................... 455/447 |

(Continued)

FOREIGN PATENT DOCUMENTS

EP 0 893 930 1/1999

(Continued)

OTHER PUBLICATIONS

Patent Abstracts of Japan, vol. 1997, No. 10, Oct. 31, 1997, JP 09 154168, Jun. 10, 1997.

(Continued)

*Primary Examiner*—George Eng
*Assistant Examiner*—Un C. Cho
(74) *Attorney, Agent, or Firm*—Oblon, Spivak, McClelland, Maier & Neustadt, P.C.

(57) ABSTRACT

The present invention concerns a method of determining the position of a mobile station in a mobile telecommunication network, the said network including a plurality of base stations designed to adopt at least on the one hand a state corresponding to periods of transmission of signals useful to the determination of the said position, the said mobile station, on reception of the said useful signals, making measurements of quantities of the said useful signals which are characteristic for using a position determination method and on the other hand a state corresponding to periods of silence during which no signal is transmitted.

According to the present invention, the said method consists of providing means so that the said periods of transmission and the said periods of silence are arranged in cycles including at least one period of silence, the cycle allocated to a base station being identical to the cycle allocated to any base station adjacent to it, but is offset from it in time.

The present invention also concerns a network designed to implement such a method.

22 Claims, 10 Drawing Sheets

U.S. PATENT DOCUMENTS

| | | | |
|---|---|---|---|
| 6,381,464 B1 * | 4/2002 | Vannucci | 455/456.1 |
| 6,438,380 B1 * | 8/2002 | Bi et al. | 455/456.1 |
| 6,490,454 B1 * | 12/2002 | Kangas et al. | 455/456.1 |
| 6,493,539 B1 * | 12/2002 | Falco et al. | 455/67.11 |
| 6,597,681 B1 * | 7/2003 | Conner | 370/347 |
| 6,671,514 B1 * | 12/2003 | Cedervall et al. | 455/456.1 |

FOREIGN PATENT DOCUMENTS

| | | |
|---|---|---|
| WO | WO 93/12587 | 6/1993 |
| WO | WO 98/59443 | 12/1998 |

OTHER PUBLICATIONS

Patent Abstracts of Japan, vol. 1998, No. 03, Feb. 27, 1998, JP 09 298766, Nov. 18, 1997.

* cited by examiner t1 t2 t3 t4 t5 t6 t7

METHOD OF DETERMINING THE POSITION OF A MOBILE STATION IN A MOBILE TELECOMMUNICATION NETWORK

The present invention concerns a method of measuring the position of a mobile station in a mobile telecommunication network.

Several positioning methods exist in the state of the art. One of these known positioning techniques consists of taking a reading of the angle of observation of at least three fixed points whose position is known in advance. From the angles measured by the unit to be positioned with respect to a fixed point, it is possible to make a reckoning, that is to say to obtain the relative position of a mobile station on a map containing the points read with a position known in advance. This technique has been known for a long time, so as to be the oldest technique used for positioning ships on the coast line, from readings made from the ship of optical beacon signals transmitted from lighthouses situated on the coast.

Another positioning method consists of measuring the distance between the unit to be positioned and at least three fixed points. From these distances, measured by the unit to be positioned, it is possible to make a reckoning, that is to say to obtain the relative position of this unit on a map containing the points read with a position known in advance. Radar points, or GPS points, come within this type of positioning.

In one or other of these methods, it is necessary to have available three points whose positions are known at each time t. These points will be referred to subsequently as fixed. In a cellular telephony network, these three points consist of three base stations, as illustrated in FIG. 1. Each of the three base stations BS1, BS2 and BS3 transmits location signals which are then received by the mobile station MS. The latter makes measurements of quantities characteristic of these signals, quantities used for implementing a position determination method. This method could be implemented by the mobile station MS itself but in practice it is implemented in a fixed position determination unit belonging to the network.

In the first operating mode mentioned above, the mobile station MS will then measure the angles $\alpha_1$, $\alpha_2$ and $\alpha_3$ which form, with a reference direction, the directions from which the signals transmitted by the base stations BS1, BS2 and BS3 are received. Then, knowing the position of each base station BS1, BS2 and BS3 and the measurement of each of these angles, it is possible to determine the position of the mobile station MS.

In the second operating mode mentioned above, the mobile station MS will measure, for example on the basis of the differences between the times of reception, by the mobile station MS, of the signals respectively transmitted by the base stations BS1, BS2 and BS3 and the times of transmission of these signals, the distances $D_1$, $D_2$ and $D_3$ between the mobile station MS and the respective base stations BS1, BS2 and BS3.

In order to measure the distances between the mobile station MS and the base stations BS1 to BS3, use is generally made of synchronised fixed stations which can transmit different signals. The mobile station is also informed of the difference between the times of transmission of these signals. The mobile station MS then measures the relative time of reception of each of the signals transmitted by the base stations BS1 to BS3 and, on the basis of these different times and the coordinates of all the base stations BS1 to BS3, deduces its position therefrom.

It should be noted that, in reality, it may be necessary, in particular in order to resolve any ambiguity in time due to a differential detection of the times of reception of the signals transmitted synchronously by all the base stations, to have available at least four (rather than three) base stations.

For locating mobile stations in a cellular network, there are advantages in using radiofrequency location signals transmitted by base stations which serve as fixed points: a single type of receiver is necessary; a multitude of known fixed points are available; the system is resistant to multipaths; it does not require a direct path and allows the location of mobile stations within buildings.

For all that, the use of synchronised base stations as fixed points for locating mobile stations in the telecommunication network poses a certain number of problems.

Amongst these, there can be cited the one where the mobile station MS which is situated close to a base station SBi whilst the latter transmits a signal which can be either a location signal or a telecommunication signal or both together, will receive this signal with a high reception level. However, the signals coming from other base stations further away will be received with a lower reception level. If these signals are also transmitted on the same time-frequency resource (such as for example in a code division multiple access (CDMA) network), the signal received from the closest base station will interfere with the signals coming from the other base stations. The latter signals will then not be able to be measured, so that the location will fail.

In order to resolve this particular problem, a solution has already been proposed which consists of the base station from time to time increasing the powers of transmission of their location signals to a sufficient level to ensure correct reception, whatever the position of the mobile between these base stations, close or not to one of these base stations.

Such a technique, however, requires these higher-power transmissions not to be all activated at the same time for all the base stations. In addition, they drastically increase the power of the location signals, to the detriment of the telecommunication signals.

Another solution consists of the base stations no longer transmitting a signal (including the telecommunication and radio location signals) for a short moment. Thus a mobile station which is situated close to a base station when the latter is silent can make measurements from signals which it has received from other base stations and which are no longer jammed by this silent base station.

This method, compared with the previous one, affords a more stable behaviour of the telecommunications network. This is because it degrades only the telecommunications signals normally transmitted by the silent base station, and on the other hand favours the telecommunications signals transmitted by the other base stations during this time. The latter signals no longer interfere with the signals from the silent base station. This method is implemented, however, to the detriment of the telecommunications signals whose transmission is interrupted during the periods of silence.

In order to reduce the impact of the location process on the telecommunications signals, it is necessary to reduce the times of silence to a minimum acceptable, that is to say typically a fraction of the time necessary for transmitting a block of data to be transmitted over the telecommunications network, without too much degradation being observed in the reception of this block of data.

However, if the time of non-transmission of the base stations is reduced too much, the mobile station no longer has sufficient time to measure the location signals.

In addition, this method assumes that the location signals are transmitted continuously. This is because, if such were not the case, the location signals of the surrounding base stations might not be present during the periods of silence of the silent base station and the mobile station could not then make its measurements. However, the continuous transmission of location signals can be contemplated only in so far as this would not excessively interfere with the telecommunications signals.

It should also be noted that adjacent base stations must not be silent at the same time, otherwise the mobile station cannot make measurements during these periods of silence.

The aim of the present invention is to propose a method which does not have the drawbacks mentioned above and which therefore enables adjacent base stations to be coordinated.

A method according to the present invention is of the type where the said network includes a plurality of base stations intended to adopt at least, on the one hand, a state corresponding to periods of transmission of signals useful for the determination of the said position, the said mobile station, on receiving the said useful signals, making measurements of quantities of the said useful signals characteristic for implementing a position determination method and on the other hand a state corresponding to periods of silence during which no signal is transmitted.

This method is characterised in that it consists of providing means so that the said periods of transmission and the said periods of silence are arranged in cycles including at least one period of silence, the cycle allocated to a base station being identical to the cycle allocated to any base station which is adjacent to it but is offset in time therefrom. The said offset in time is advantageously equal to a sub-multiple of the duration of a cycle.

According to another characteristic of the invention, the number of periods of silence per cycle is greater than one and the interval of time between two adjacent periods of silence is equal to a base period which is a sub-multiple of the duration of a cycle. The offset in time between two base stations is advantageously an integer multiple of the said base period.

According to another characteristic of the invention, each cycle comprises, in addition to at least one period of transmission of telecommunication signals and at least one period of silence, a period of transmission of specific location signals.

According to another characteristic of the invention, the interval of time between two adjacent location signal transmission periods, the one between a period of transmission of location signals and an adjacent period of silence, the one between a period of silence S and an adjacent period of transmission of location signals E and the one between two adjacent periods of silence are identical and equal to the said base period.

According to another characteristic of the invention, the transmission power of the specific location signals is higher than the transmission power of the telecommunication signals.

According to another characteristic of the invention, the periods of transmission of the location signals are of the same duration as the periods of silence S.

According to another characteristic of the invention, each base station in the network, in order to be controlled, receives two items of information: on the one hand, an item of information representing the diagram of the cycle allocated to it and on the other hand an item of information representing the offset in time of its cycle with respect to a reference.

According to another characteristic of the invention, the base stations in the said network are grouped together by identical groups of adjacent base stations, the base stations in the same group having the same cycle scheme but different offsets and two base stations which match each other in pairs from one group to another having their time offsets different.

According to another characteristic of the invention, the said base stations are grouped together by a number N, the said base stations having cycles with M base periods PB greater than N.

The present invention also concerns a mobile telecommunication network which is designed to be able to implement the method whose essential characteristics have just been described.

The characteristics of the invention which have been mentioned above, as well as others, will emerge more clearly from a reading of the following description of an example embodiment, the said description being made in relation to the accompanying drawings, amongst which:

FIG. 1 is a schematic view of a network with three base stations illustrating the determination of the position of a mobile station in this network, FIGS. 2a and 2b are respectively two time diagrams of the power emitted by the three base stations in a network which on the one hand is in accordance with the one in FIG. 1 and on the other hand uses a first mode and a second mode of implementing a method according to the present invention, FIG. 3 is a schematic view of a network with seven base stations intended to implement a method according to the present invention, FIGS. 4a and 4b are respectively two time diagrams of the power emitted by the seven base stations in a network which on the one hand is in accordance with the one in FIG. 3 and on the other hand uses two modes of implementing a method according to the present invention, FIGS. 5a to 5c are schematic views of one and the same network illustrating a mode of implementing the method of the present invention, at seven different times, FIG. 6 is a schematic view of one and the same network illustrating a mode of implementing the method of the present invention, at three different times, and FIG. 7 is a time diagram of the power emitted by the three base stations in a network which on the one hand is in accordance with the one in FIG. 1 and on the other hand uses a mode of implementing a method according to the present invention.

In FIG. 1, it can be seen that the base stations BS1, BS2 and BS3 are controlled by a control unit 10 so that they can adopt at least two transmission states: a state corresponding to periods of transmission of telecommunication signals also including user signals and signalling and synchronisation signals and a state corresponding to periods of silence during which no signal is transmitted.

In order to be able to determine the location of a mobile station MS, the latter must implement a method of measuring physical quantities, such as the time of arrival or the angle of incidence, of the location signals which it receives from the base stations. These signals can be synchronisation signals which are contained in the telecommunication signals transmitted by the base stations.

According to one characteristic of the present invention, the base stations in the network are controlled so that the periods of transmission of telecommunications signals and the periods of silence are arranged in cycles including at least one period of silence. The cycle allocated to a base station is identical to the cycle allocated to any base station which is adjacent to it but is offset in time from it.

The concept of adjacency used here is for example defined by the control unit of the unit 10 which controls the functioning of the base stations BS1, BS2 and BS3 in the network. Thus this control unit 10 determines, for each time t, for example, the base stations which must transmit their telecommunication signals and the base stations which must remain silent whilst taking account of the cycles allocated to each of them.

FIG. 2a depicts the power which is transmitted as a function of the time t by the base stations BS1, BS2 and BS3 in the network depicted in FIG. 1. In this FIG. 2a, each base station BS1, BS2, BS3 transmits a telecommunication signal also including user signals and signalling and synchronisation signals interspersed with periods of silence denoted S. The periods of transmission of the telecommunication signals are denoted T. In FIG. 2a, the transmission cycle Cy allocated to the base station BS1 has been shown. It will be noted that, in this particular case, a cycle Cy includes only one period of silence S.

Compared with the cycle Cy, the cycle allocated to the base station BS2 (not shown in its entirety) is offset in time by a time denoted D2 and the one allocated to the base station BS3 is offset by a time denoted D3. It should be noted that the base station BS1 is here taken as a reference. The times D2 and D3 are determined or predetermined in the control unit 10.

According to another characteristic of the present invention, each cycle also comprises, in addition to at least one period of transmitting telecommunication signals and at least one period of silence, at least one period of transmitting specific location signals.

Thus, as can be seen in FIG. 2b, a base station BS1, BS2 or BS3 can be in three transmission states: a state corresponding to periods denoted T, of transmitting telecommunication signals, a state, corresponding to periods, denoted E, of transmitting specific location signals and a state corresponding to periods, denoted S, of silence during which neither telecommunication signals nor location signals are transmitted by the corresponding base station.

It should be noted that the transmission power of the specific location signals is generally higher than the transmission power of the telecommunication signals.

According to one characteristic of the present invention, the periods of transmission of the location signals E are of the same duration as the periods of silence S.

In this FIG. 2b, it will be noted that the time offset D2 between the cycle allocated to the base station BS1 and the one allocated to the base station BS2 is equal to the interval of time which separates a period of silence and a transmission period E. Thus, when at least one base station, in this case the base station BS1 at time t1 or the base station BS2 at time t2, is in a period of silence, the base stations BS2 and BS3 at time t1 and then the base stations BS1 and BS3 t2 which are adjacent to it are in a period of transmission of their location signals.

It should be noted that the base stations alternate, in a regular manner, the periods of silence, the periods of transmission of location signals and the periods of normal communication, and this under the control of the control unit 10 of the network to which the base stations concerned belong (in this case, in FIG. 1, the base stations BS1, BS2 and BS3).

FIG. 3 depicts a network with seven base stations BS1 to BS7, whose respective coverages, also referred to in the art as cells, are shown diagrammatically in the form of adjacent hexagons. In reality, the signals transmitted by the base stations SB1 to SB7 can be received beyond their respective cells. This is particularly true with regard to the specific location signals which they transmit, in the example depicted in FIG. 3, to any mobile station MS able to receive them.

All the base stations BS1 to BS7 in this network are controlled by a control unit 10 which provides, amongst other things, the synchronisation of their respective transmissions.

FIG. 4a depicts the transmission power of each base station in this network as controlled by the control unit 10 in a first exemplary embodiment. In this FIG. 4a, the periods of transmission of telecommunication signals are denoted T, the periods of transmission of the location signals are denoted E and the periods of silence are denoted S. As can be seen, each base station BS1 to BS7 transmits in accordance with a cycle consisting of transmission periods T separated from each other by a period of silence S followed by six transmission periods E. Thus, at time t1, whilst the base station BS1 is silent, all the base stations BS2 to BS7 transmit their location signals. Likewise, at time t2, whilst the base station BS2 is silent, all the base stations BS1, BS3 to BS7 transmit their location signals. And so on . . .

The durations of the telecommunication periods between two location signal transmission periods E, those between a location signal transmission period E and a period of silence S, and those between a period of silence S and a location signal transmission period E are identical and equal to a period which will be referred to hereinafter as the base period PB. The offset in time between two base stations is an integer multiple of this base period PB. It is for example equal to PB between the base station BS1 and the base station BS2, 2. PB between the base station BS1 and the base station BS3, etc.

It can be seen that, whilst a single base station (for example the base station BS1 at time t1) is silent, the others transmit location signals (for example the base stations BS2 to BS7). A mobile station MS during this period of time, receives the location signal from the base stations BS2 to BS7 and can therefore, normally, immediately determine its position on the basis of these signals. Although this particular implementation gives entire satisfaction, there are cases where the problem of interference between base stations transmitting at the same time is posed.

FIG. 4b depicts the transmission power of each base station in the network depicted in FIG. 3 as controlled by the control unit 10 in a second exemplary embodiment. As can be seen, each base station BS1 to BS7 transmits in accordance with a cycle consisting of transmission periods T separated from each other by a transmission period E followed by six periods of silence S. At time t1, whilst the base station BS1 transmits a location signal, all the base stations BS2 to BS7 are silent. Likewise, at time t2, whilst the base station BS2 transmits a location signal, all the base stations BS1, BS3 to BS7 become silent. And so on . . .

It will be noted that this implementation can be seen as equivalent to the previous one implemented in which the periods of silence and the location periods are exchanged. It also has the same characteristics of offset in time.

In this embodiment, whilst a base station (for example the base station BS1) transmits a location signal, the other base stations (for example the base stations BS2 to BS7) are in a period of silence. As a result a mobile station receives, during this period, only one specific location signal, which is not jammed by interference with other signals transmitted by other base stations. Nevertheless, in order to effect a determination of position, several measurements will then be necessary for it.

Other implementations could also be provided. For example, for each base station and in one cycle, several transmission periods E could follow several periods of silence S, the result being able to be seen as a combination of the embodiments depicted in FIGS. 4a and 4b.

According to one advantageous embodiment, the control unit 10 transmits two items of information to each of the base stations BS1 to BS7 in the network: on the one hand the scheme of the cycle Cy, that is to say its constitution in terms of transmission periods E and periods of silence S, their respective number, and their positioning in the cycle, and, on the other hand, an offset in time Di (i=1 to 7) with respect to a reference. Advantageously, this offset in time is a multiple of the base period PB.

In the example in FIG. 4a, the constitution of the cycle is as follows: a period of silence S followed by six location signal transmission periods E. The offset is zero for the base station BS1, equal to one base period PB for the base station BS2, equal to two base periods PB for the base station BS3, etc.

Likewise, in the example in FIG. 4b, the constitution of the cycle is as follows: a location signal transmission period E followed by six periods of silence S. As for the offset, it is zero for the base station BS1, equal to one base period PB for the base station BS2, equal to two base periods PB for the base station BS3, etc.

According to another characteristic of the present invention, the base stations in a network are grouped together by identical groups of adjacent base stations. Within each group, the base stations have the same cycle constitution but different offsets. From one group to another in the same network, the base stations correspond in pairs. Two base stations which correspond to each other have the same position relatively to the other base stations in the same groups as them and their offsets in time are equal.

For example, in FIGS. 5a to 5c, the base stations are shown diagrammatically by their respective cells. They are grouped together so as to form groups (six, GR1 to GR6, are visible in FIGS. 5a to 5c) of seven base stations arranged like those depicted in FIG. 3. In FIGS. 5a to 5c, these groups are depicted surrounded by bold lines. Also in FIGS. 5a to 5c, the base stations in two different groups which correspond to each other bear the same reference.

FIGS. 5a to 5c depict the different transmission states of the base stations at seven different times t1 to t7.

At time t1, whilst the base stations 7 are in a first transmission state (a state of silence or a state of transmission), the other base stations 1 to 6 are in a second transmission state (respectively a state of transmission or a state of silence).

At time t2, it is the base stations 6 in each group which are in a first transmission state (a state of silence or a state of transmission) whilst the other base stations 1 to 5 and 7 are in a second transmission state (respectively a state of transmission or a state of silence).

And so on up to time t7, after which time t1 is started at again.

It can be seen that, in the particular geometry of each group and having regard to the organisation of the transmission cycles, a base station which is in a first transmission state is always surrounded by six base stations which are in a second transmission state. It can also be seen that two base stations which correspond to each other in two adjacent groups are separated from each other by at least two base stations.

Figure 1:
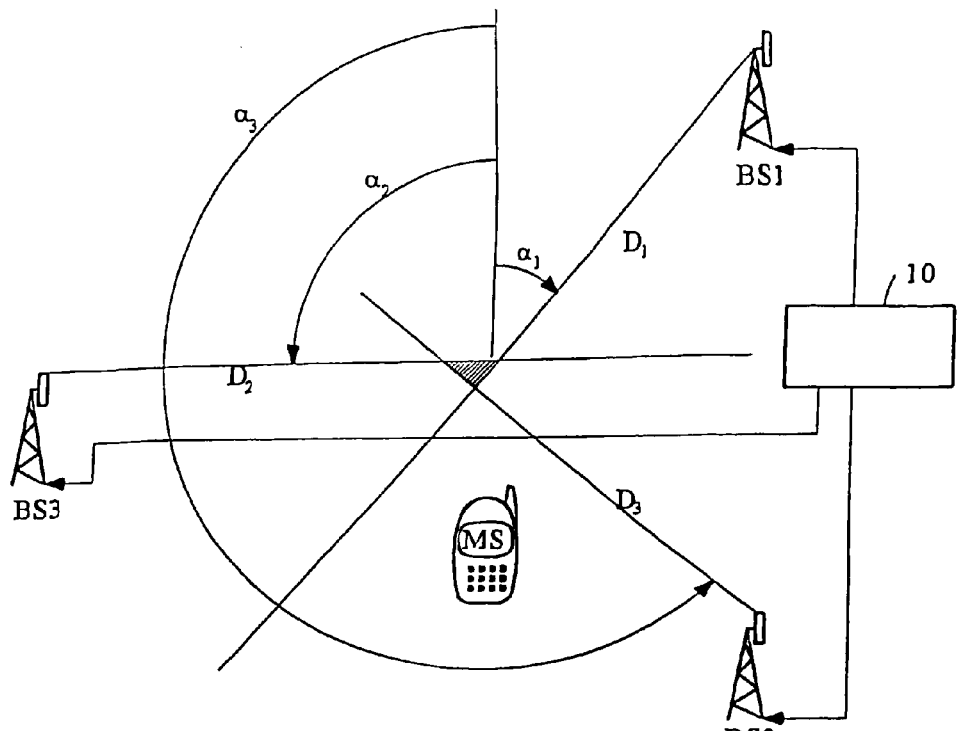
Figure 2A:
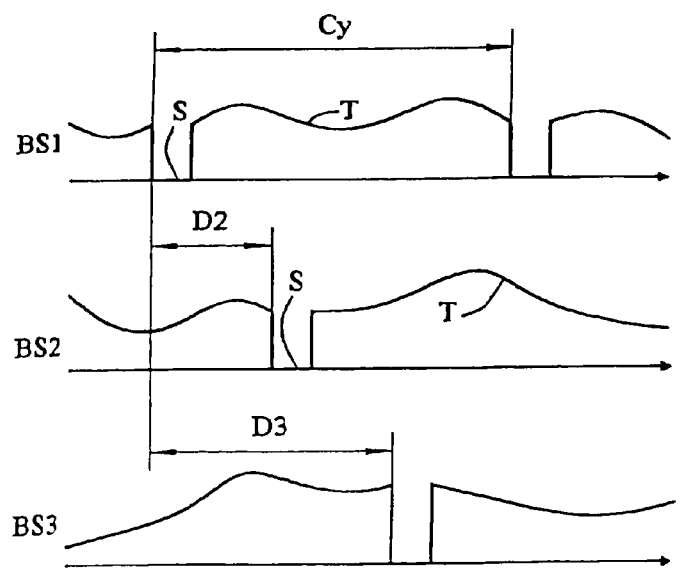
Figure 2B:
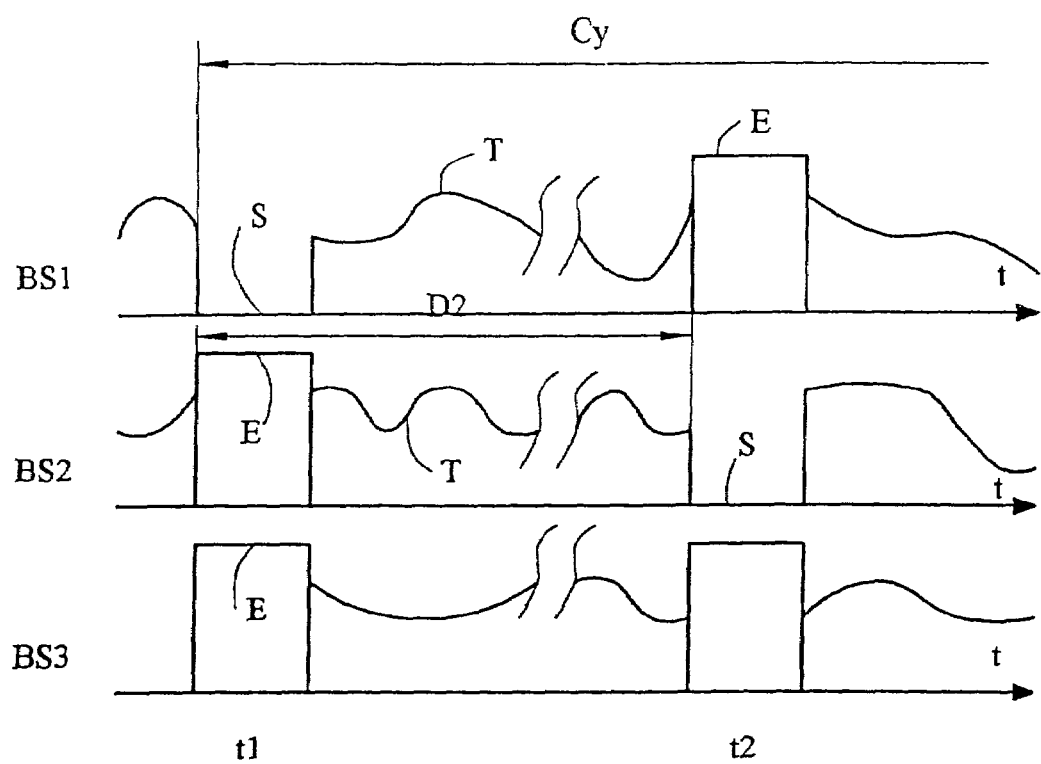
Figure 3:
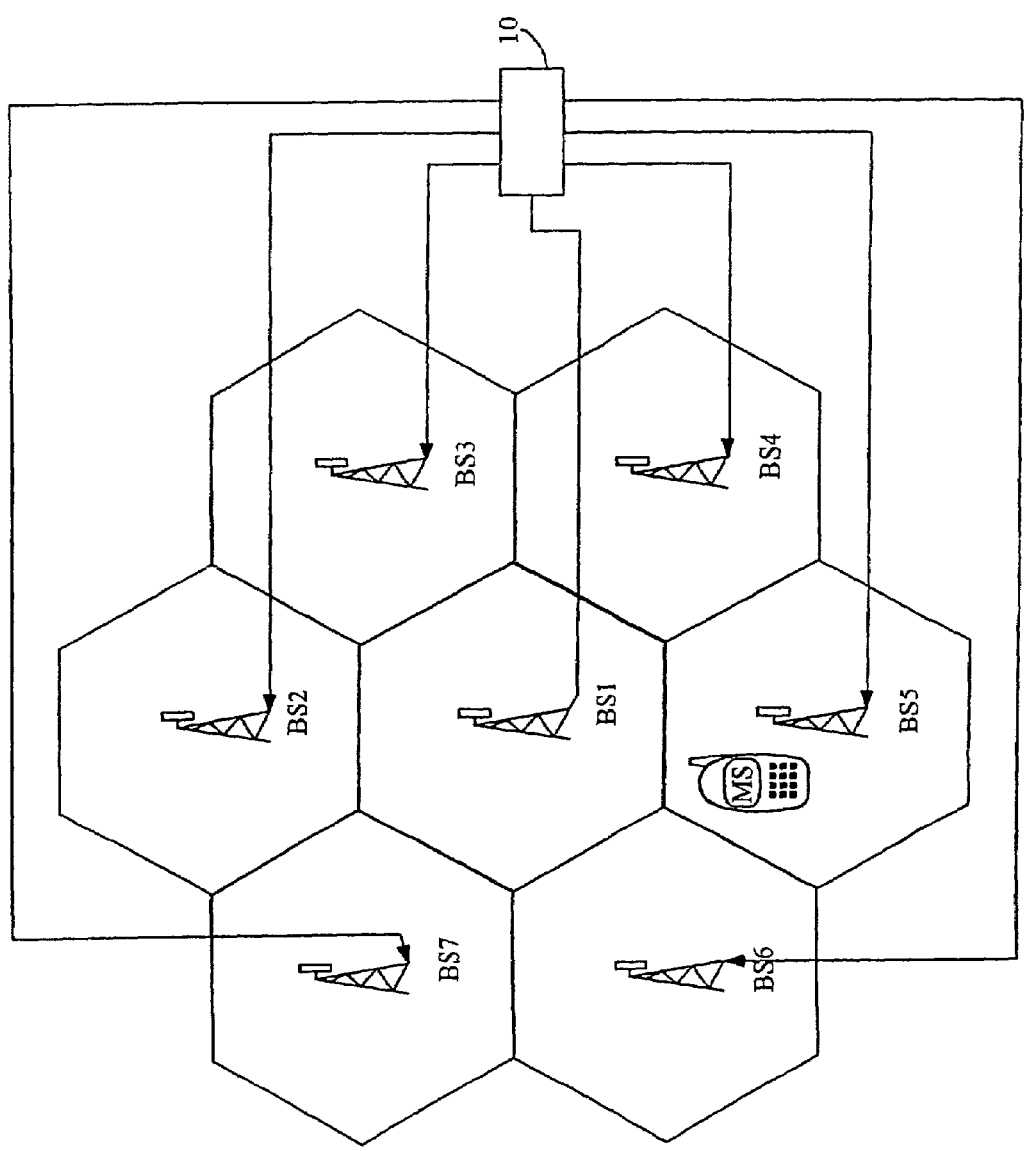
Figure 4A:
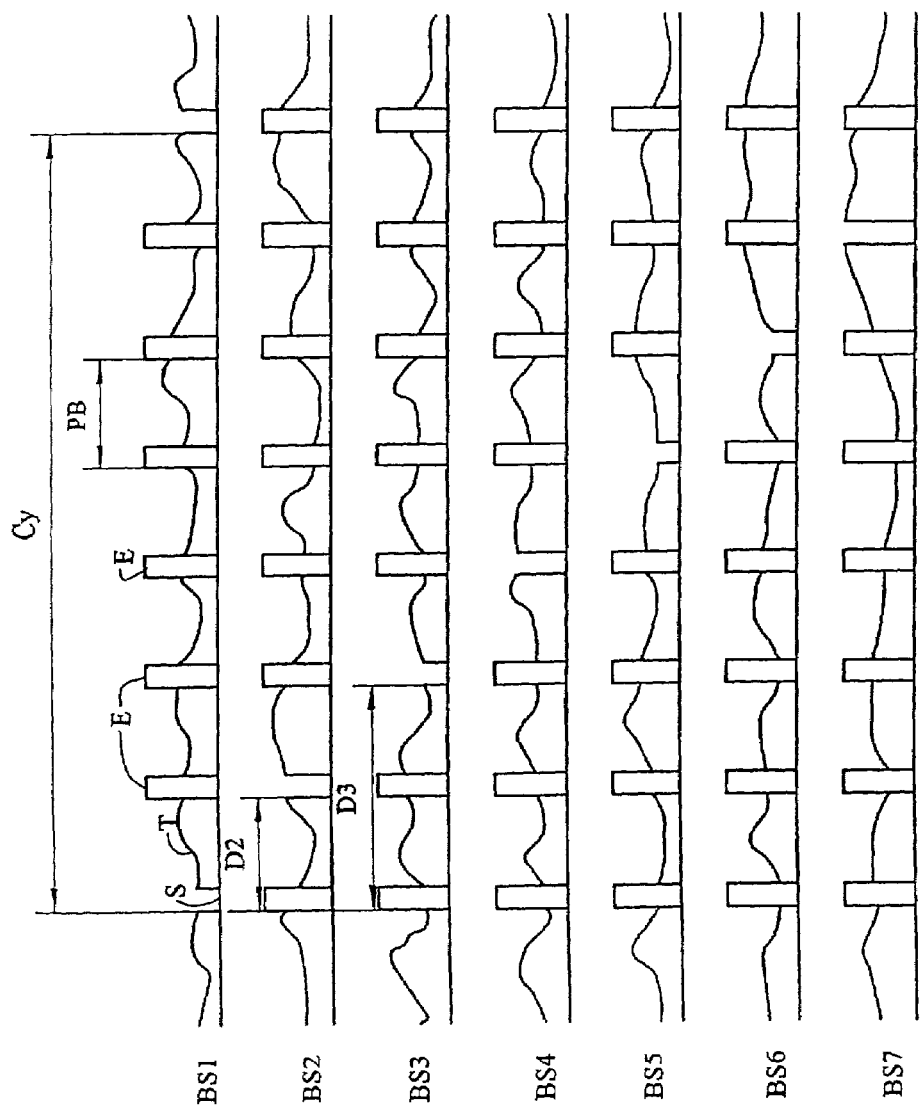
Figure 4B:
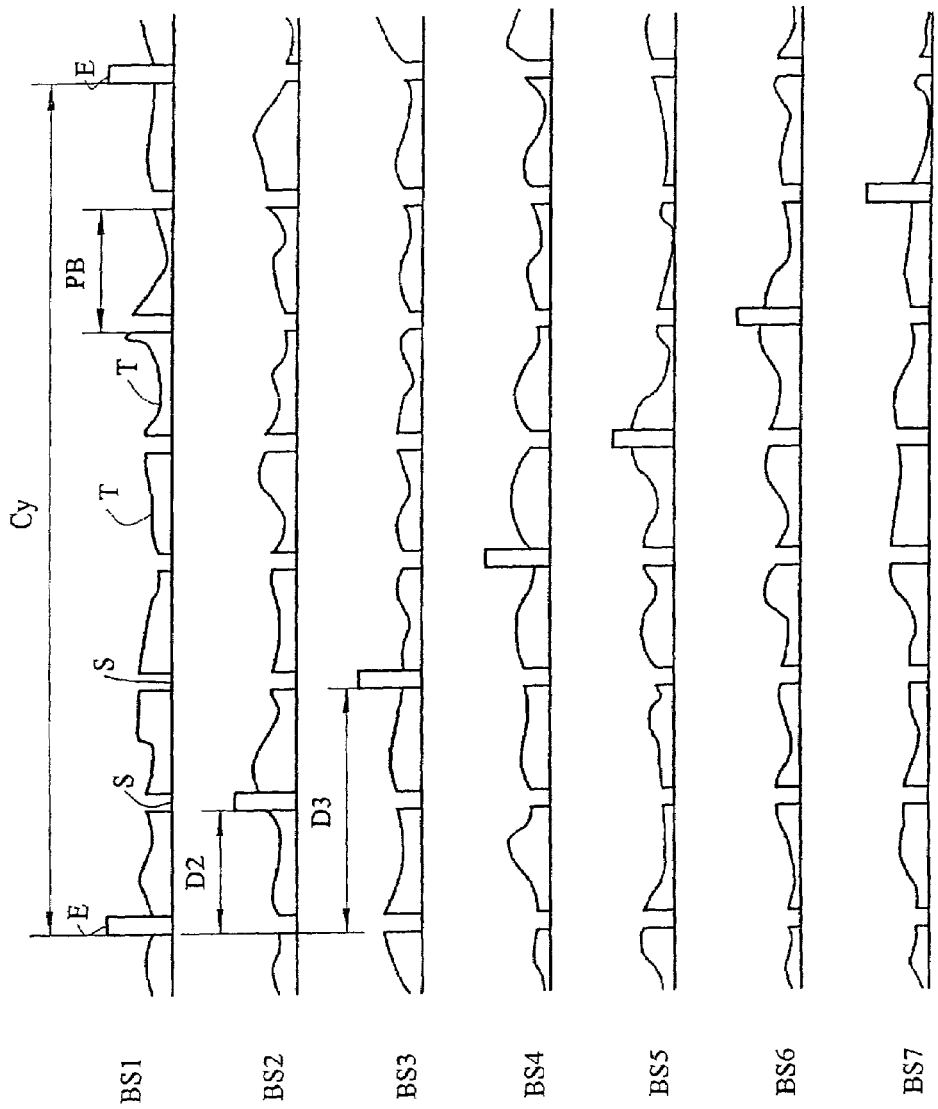
Figure 5A:
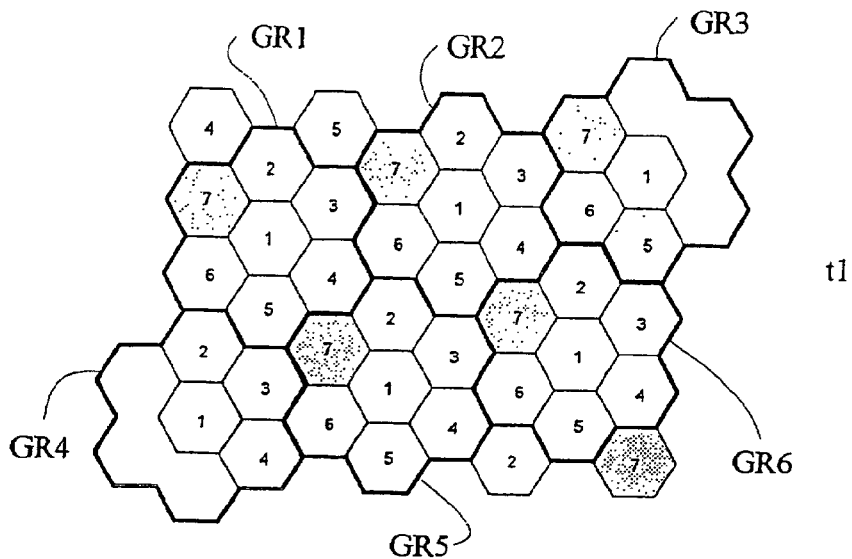
FIGS. 5a to 5c depict in grey tint a cell whose base station is in a first transmission state (either a state of silence, or a state of transmission of location signals or telecommunication signals) and in white a cell whose base station is in a second transmission state (respectively either a state of transmission of location signals or telecommunication signals, or a state of silence).
Figure 5A:
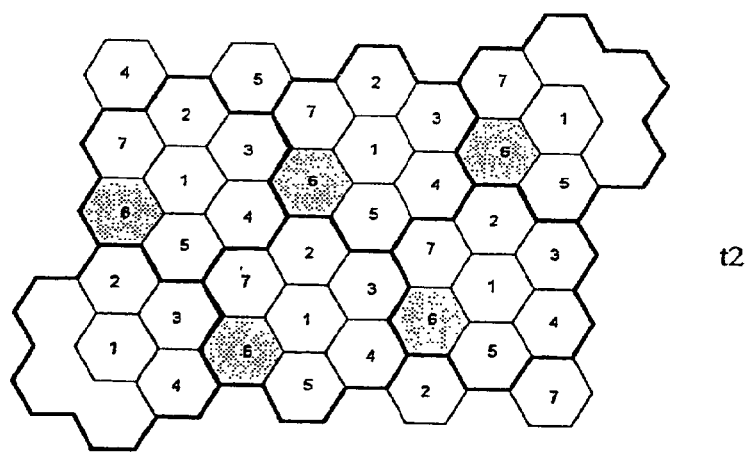
Figure 5A:
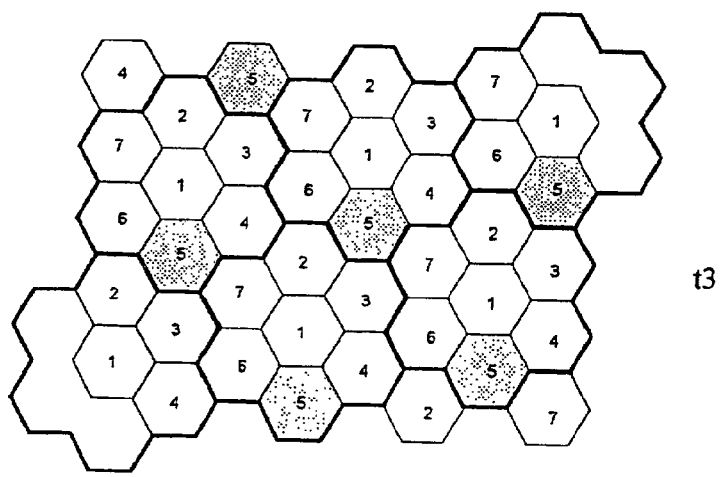
Figure 5B:
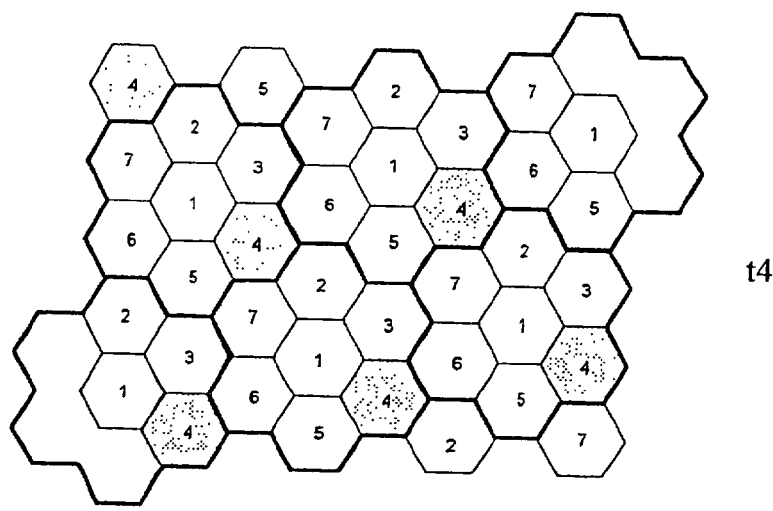
Figure 5B:
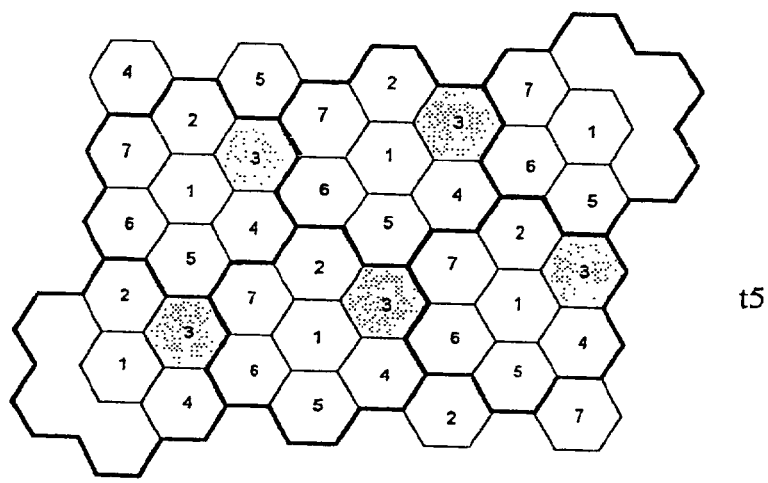
Figure 5B:
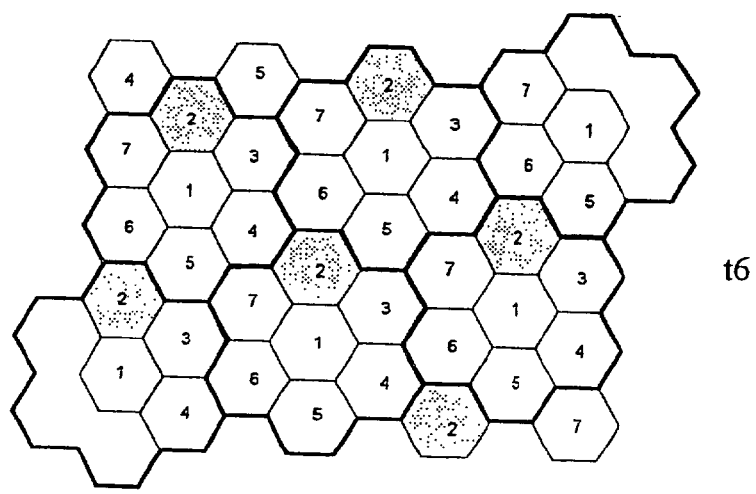
Figure 5C:
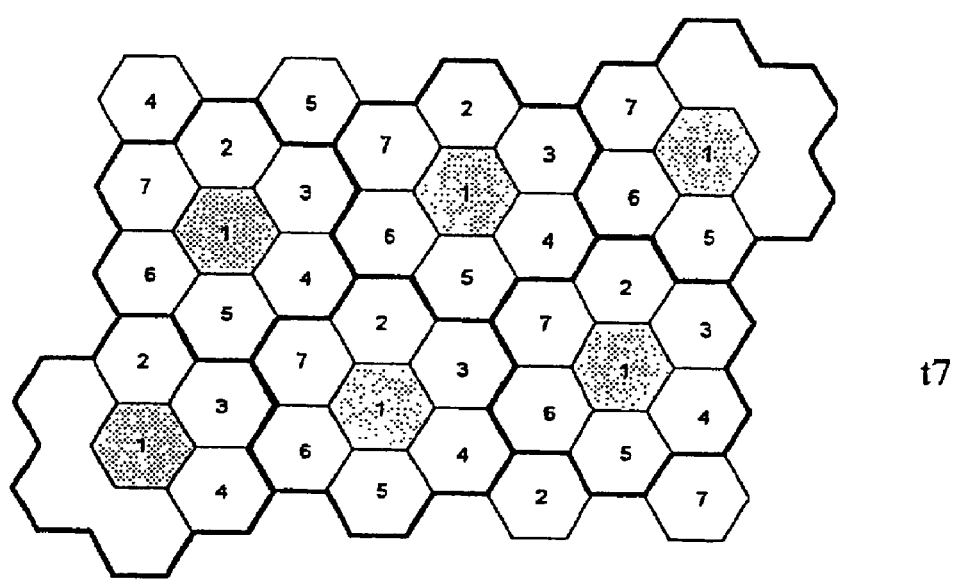
Figure 6:
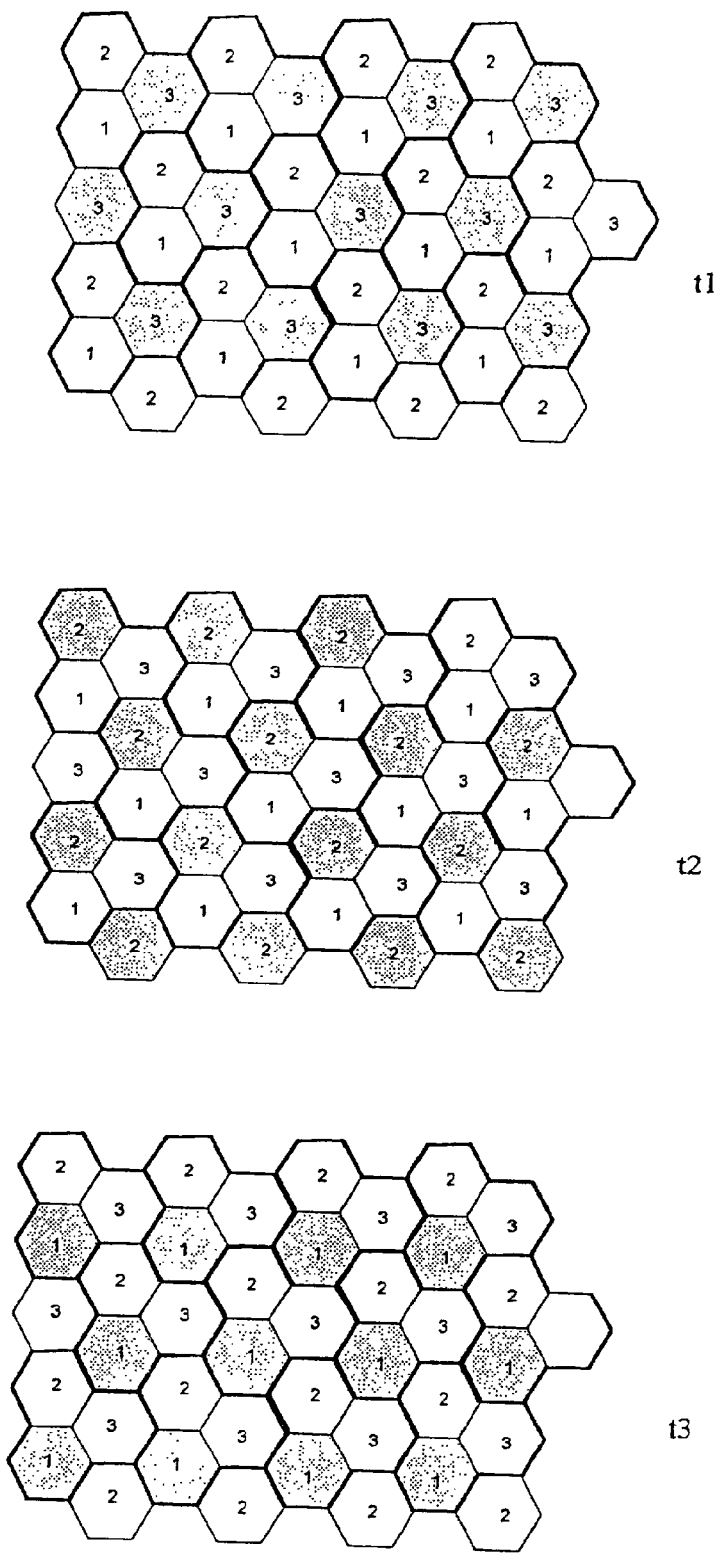

FIG. 6 depicts diagrams identical to the diagrams in FIGS. 5a to 5c but for groups consisting solely of three base stations. Like that which occurred in FIGS. 5a to 5c, it can be seen that, at time t1, whilst the base stations 3 are in a first transmission state (a state of silence or a state of transmission), the other base stations 1 and 2 are in a second transmission state (respectively a state of transmission or a state of silence). Likewise, at time t2, it is the base stations 2 in each group which are in a first transmission state (a state of silence or a state of transmission) whilst the other base stations 1 and 3 are in a second transmission state (respectively a state of transmission or a state of silence). Finally, at time t3, it is the base stations 1 in each group which are in a first transmission state (a state of silence or a state of transmission) whilst the other base stations 2 and 3 are in a second transmission state (respectively a state of transmission or a state of silence).

It can be seen in these two example implementations that the size of the groups used determines the number of location signal transmission periods and the number of silent periods within the same cycle. These periods are seven in number in the case where each group consists of seven base stations and are three in number in the case where it consists of three base stations.

In the examples given above, the number of transmission periods where the base stations are in a first state is equal to one, and the number of transmission periods where they are in a second transmission state is respectively six and two. This being the case, other configurations of the cycles can be envisaged without for all that departing from the context of the present invention.

Figure 7:
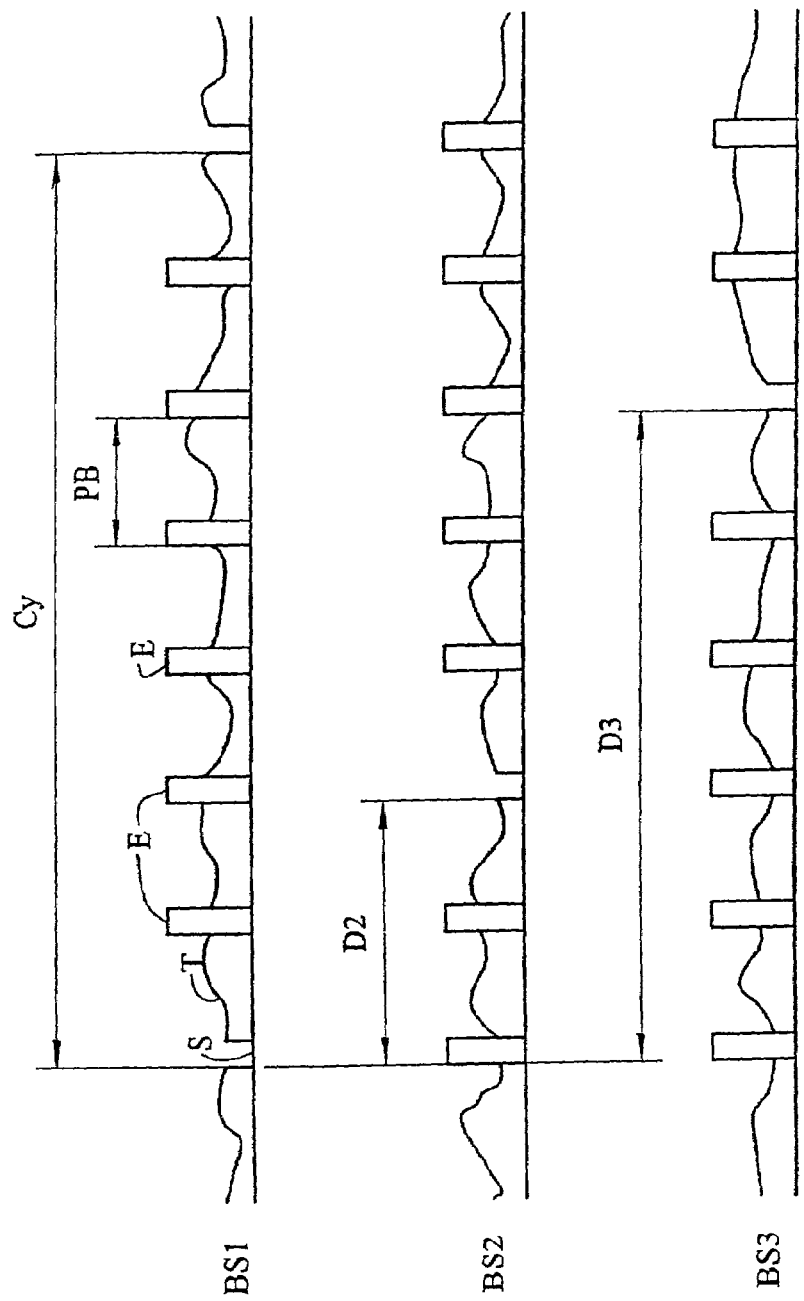

FIG. 7 depicts the transmission powers of three base stations BS1, BS2 and BS3 to which cycles with seven base periods PB are respectively allocated. In general terms, base stations in a network can be grouped together by a number N, these base stations having cycles with M base periods PB greater than N. This makes it possible to ensure not having to produce a new grouping plan too often when new base stations are added to the network.

In the example given above with reference to FIG. 7, the number of sites can be more than doubled without requiring a complete review of the entire planning of the offsets. It suffices in fact to allocate, within the same grouping, the offsets which have remained available for the new base stations added within this grouping.

The invention claimed is:

1. Method of determining the position of a mobile station in a mobile telecommunication network, the said network including a plurality of base stations designed to adopt at least on the one hand a state corresponding to periods of transmission of signals useful to the said mobile station for determining the said position, and on the other hand a state corresponding to periods of silence during which no signal is transmitted, comprising:

arranging said periods of transmission and the said periods of silence in cycles including at least one period of silence, wherein a cycle allocated to a base station is identical to a cycle allocated to any base station adjacent to it, but is offset in time from it, and each of said offsets in time is equal to a sub-multiple of the duration of said cycle.

2. Determining method according to claim 1, characterised in that the number of periods of silence per cycle is greater than one and in that the interval of time between two adjacent periods of silence is equal to a base period which is a sub-multiple of the duration of a cycle.

3. Determining method according to claim 2, characterised in that an offset in time between two base stations is an integer multiple of the said base period.

4. Determining method according to claim 1, characterised in that each cycle comprises, in addition to at least one telecommunication signals transmission period and at least one period of silence, a period of transmitting specific location signals.

5. Determining method according to claim 4, characterised in that the interval of time between two periods of transmitting adjacent location signals, the one between a period of transmitting location signals and a period of silence which are adjacent, the one between a period of silence S and a period of transmitting location signals E which are adjacent and the one between two adjacent periods of silence are identical and equal to the said base period.

6. Determining method according to claim 4, characterised in that the transmission power of the specific location signals is higher than the transmission power of the telecommunication signals.

7. Determining method according to claim 4, characterised in that the periods of transmission of the location signals are of the same duration as the periods of silence S.

8. Determining method according to claim 1, characterised in that each base station in the network, in order to be controlled, receives two items of information: on the one hand an item of information representing the scheme of the cycle allocated to it and on the other hand an item of information representing the offset in time of its cycle with respect to a reference.

9. Determining method according to claim 1, characterised in that the base stations in the said network are grouped together by identical groups of adjacent base stations, the base stations in the same group having the same cycle scheme but different offsets and two base stations which correspond to each other in pairs from one group to another having their offsets in time equal.

10. Determining method according to claim 9, characterised in that the said base stations in a network are grouped together by a number N, the said base station having cycles with M base periods PB greater than N.

11. A base station controller configured to execute the method as recited in any one of claims 1 or 2–10.

12. A base station configured to be controlled by the base station controller recited in claim 11.

13. Mobile telecommunication network including a plurality of base stations controlled by a control unit so that the said base stations can adopt at least on the one hand a state corresponding to periods of transmission of signals useful to a mobile station for determining its position by the use of a position determination method and on the other hand a state corresponding to periods of silence during which no signal is transmitted, characterised in that the said control unit is designed so that the said periods of transmission and the said periods of silence are arranged in cycles including at least one period of silence, wherein a cycle allocated to a base station is identical to a cycle allocated to any base station which is adjacent to it, but is offset in time from it, and each of said offsets in time is equal to a sub-multiple of the duration of a cycle.

14. Network according to claim 13, characterised in that the number of periods of silence per cycle is greater than one and in that the interval of time between two adjacent periods of silence is equal to a base period which is a sub-multiple of the duration of a cycle.

15. Network according to claim 14, characterised in that an offset in time between two base stations is an integer multiple of the said base period.

16. Network according to one of claims 13, characterised in that each cycle comprises, in addition to at least one period of transmission of telecommunication signals and at least one period of silence, a period of transmission of specific location signals.

17. Network according to claim 16, characterised in that the interval of time between two periods of transmitting adjacent location signals, the one between a period of transmitting location signals and a period of silence which are adjacent, the one between a period of silence S and a period of transmitting location signals E which are adjacent to each other and the one between two adjacent periods of silence are identical and equal to the said base period.

18. Network according to claim 16, characterised in that the transmission power of the specific location signals is higher than the transmission power of the telecommunication signals.

19. Network according to claim 18, characterised in that the periods of transmission of the location signals are of the same duration as the periods of silence S.

20. Network according to claim 13, characterised in that each base station in the network, in order to be controlled, receives two items of information: on the one hand an item of information representing the scheme of the cycle allocated to it and on the other hand an item of information representing the shift in time of its cycle with respect to a reference.

21. Network according to claim 13, characterised in that the base stations in the said network are grouped together by identical groups of adjacent base stations, the base stations in the same group having the same cycle scheme but different offsets and two base stations which correspond to each other in pairs from one group to another having their offsets in time equal.

22. Measurement method according to claim 21, characterised in that the said base stations in a network are grouped together by a number N, the said base stations having cycles with M base periods PB greater than N.

* * * * *